Feb. 26, 1946.  W. L. PETERSON  2,395,641

FISH LURE

Filed Dec. 4, 1944

Inventor
Walter L. Peterson.

By Clarence A. O'Brien
and Harvey B. Jackson
Attorneys

Patented Feb. 26, 1946

2,395,641

UNITED STATES PATENT OFFICE 2,395,641

FISH LURE

Walter L. Peterson, Milwaukee, Wis.

Application December 4, 1944, Serial No. 566,540

3 Claims. (Cl. 43—47)

My invention relates to improvements in fish lures for trolling especially, although not necessarily.

The invention is designed with the primary object in view of providing a fish lure of the artificial minnow type adapted to function as a spinner and equipped with duplex hooks settable so as to obviate fouling by weeds and the like, and into cocked positions for automatic operation to embed the same into the mouths of biting fish.

Another object is to provide a device of the character and for the purposes above set forth which is simple in construction, involves a minimum number of parts, is proof against developing defects, may be formed, for the greater part, out of stamped metal, and is otherwise adapted to be manufactured at a low cost.

To the accomplishment of the above, and subordinate objects presently appearing, a preferred embodiment of my invention has been illustrated in the accompanying drawing, set forth in detail in the succeeding description, and defined in the claims appended hereto.

Figure 1:
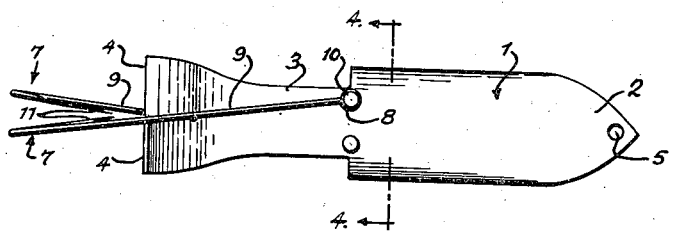
Figure 2:
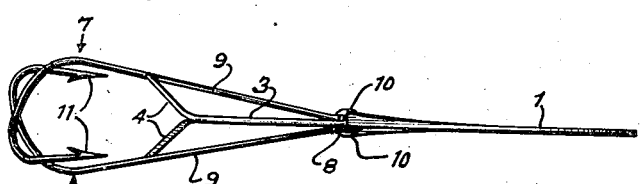
Figure 3:
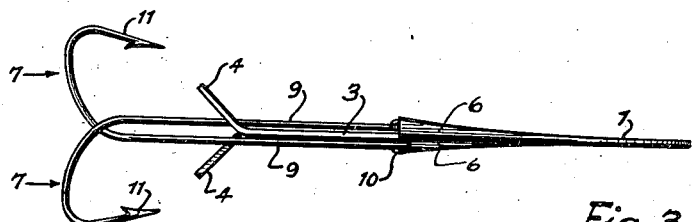
Figure 4:
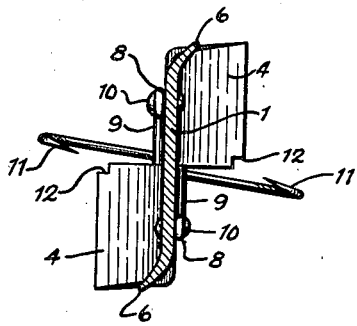

In said drawing:

Figure 1 is a view in side elevation of my improved fish lure with the hooks set, Figure 2 is a view in edge elevation of the same, Figure 3 is a view similar to Figure 2 showing the hooks sprung from cocked positions, and Figure 4 is a view in transverse section taken on the line 4—4 of Figure 1, and drawn to an enlarged scale.

Referring to the drawing by numerals, my improved fish lure, as shown, comprises a body 1 of flat rigid material, preferably shiny metal, provided with a pointed, snout-like front end 2, a coplanar elongated tail 3 reduced in width as compared with that of the body 1, for a purpose presently seen, and a pair of flat blades 4 at the end of said tail 3 arranged upon opposite sides of the longitudinal axis of said body and tail and inclining laterally and rearwardly, oppositely, from opposite sides of the tail. The front end 2 is provided with an aperture 5 for the attachment of a line, not shown, thereto.

The side edges of the body 1 from the tail 3 are bent laterally and oppositely to form longitudinal fins 6 inclined at obtuse angles from the plane of the body 1 and tapering forwardly. The fins 6 are inclined on each side of the longitudinal axis of the body toward the same side of said body as the blades 4 on the same side of said axis. As will be seen in Figures 2 and 3, the fins 6 merge with the edges of the front end 2 at the line where the latter begins to taper to form the end.

A pair of hooks 7 having front end eyes 8 on the shanks 9 thereof are riveted, as at 10, through said eyes 9 to opposite sides of the body at the juncture of the body and tail 3 and upon opposite sides of the longitudinal axis of said body and tail, with the shanks 8 thereof extending rearwardly of the blades 4 between the same and terminating in the usual barb ends 11 trailing said blades 4. As best shown in Figure 1, the hooks 7 from the rivets 10 are arranged so that the shanks 9 incline into crossed relation to dispose the barb ends 11 in spaced-apart, overlying relation. The shanks 9 of the hooks 7 are formed of flexible, resilient material and the blades 4 in the contiguous side edges thereof with corner notches 12 into which said shanks 9 may be set and cocked by flexing said shanks outwardly. The shanks 9 are arranged to bear, under tension, against said contiguous edges of the blades 4 so that when the same are flexed outwardly, said shanks will snap into said notches 12 into set, cocked positions in which the barb ends 11 are spaced apart side by side sufficiently for the fish to bite, but in a manner such that the shanks 9 fend weeds away from said barb ends 11 and prevent such matter from fouling the hooks. As best shown in Figure 2, when said hooks 7 are set and cocked, the shanks 9 diverge rearwardly across the blades 4 and thereby act to fend weeds away from the blades and prevent fouling thereof.

Referring now to the operation of the described invention. When the lure is drawn through the water, as in trolling, the fins 6 and blades 4 cause the same to spin rapidly, or revolve, in the water. With the hooks 7 set and cocked, as described, when a fish bites, or strikes, the shanks 9 are unseated, or released, from the notches 12 and spring inwardly along the contiguous edges of the blades 4 close to the sides of the tail 3, thereby moving the barb ends 11 outwardly, and laterally, to thrust said ends into the mouths of the fish, or into the body of the fish, and thereby securely hook the same.

The described lure, with the exception of the hooks 7 and rivets 10, may be stamped out of any suitable inexpensive metal, subsequently plated to render the same shiny for reasons which will be understood, or the body 1 and tail 3 may be painted in various colors to attract the fish.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. A fish lure of minnow-like form comprising a rigid flat body having a tail terminating in a pair of flat blades inclined oppositely rearwardly from opposite sides of the tail and upon opposite sides of the longitudinal axis of said body to cause the same to spin in the water when drawn therethrough, and a pair of hooks having shanks fixed to opposite sides of said body to extend along said tail and barb ends trailing said blades whereby said hooks are spun with said body with said ends exposed in the rear of said tail, said barb ends overlapping in spaced-apart side-by-side relation and being turned inwardly toward each other to render the same accessible to fish and obviate fouling of the hooks by weeds, said shanks being resilient for flexing into a cocked position to hold said barbed ends in said relation, said blades embodying means for releasably interlocking with said shanks to maintain the same in cocked position.

2. A fish lure of minnow-like form comprising a rigid flat body having a tail terminating in a pair of flat blades inclined oppositely rearwardly from opposite sides of the tail and upon opposite sides of the longitudinal axis of said body to cause the same to spin in the water when drawn therethrough, and a pair of hooks having shanks fixed to opposite sides of said body to extend along said tail and barb ends trailing said blades whereby said hooks are spun with said body with said ends exposed in the rear of said tail, said barb ends overlapping in spaced-apart side-by-side relation and being turned inwardly toward each other to render the same accessible to fish and obviate fouling of the hooks by weeds, the shanks of said hooks being resilient for flexing laterally away from said tail and to spring back toward the tail, said blades having notches therein with which said shanks may be interlocked in set cocked position by such flexing for release by biting fish to spring back and thrust the barb ends into the fish.

3. A fish lure of minnow-like form comprising a rigid flat body having a tail terminating in a pair of flat blades inclined oppositely rearwardly from opposite sides of the tail and upon opposite sides of the longitudinal axis of said body to cause the same to spin in the water when drawn therethrough, and a pair of hooks having shanks fixed to opposite sides of said body to extend along said tail and barb ends trailing said blades whereby said hooks are spun with said body with said ends exposed in the rear of said tail, said barb ends overlapping in spaced-apart side-by-side relation and being turned inwardly toward each other to render the same accessible to fish and obviate fouling of the hooks by weeds, said body having elongated longitudinally tapering side edge fins each inclined laterally from the same side of the body as the blades on the same side of said longitudinal axis, said fins coacting with said blades to cause said body to spin, said shanks being resilient for flexing into a cocked position to hold said barbed ends in said relation, said blades embodying means for releasably interlocking with said shanks to maintain the same in cocked position.

WALTER L. PETERSON.